United States Patent
Haddad

(10) Patent No.: US 8,655,158 B2
(45) Date of Patent: Feb. 18, 2014

(54) APPARATUS AND METHOD FOR INDEXING MPEG VIDEO DATA TO PERFORM SPECIAL MODE PLAYBACK IN A DIGITAL VIDEO RECORDER AND INDEXED SIGNAL ASSOCIATED THEREWITH

(75) Inventor: Semir S. Haddad, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1568 days.

(21) Appl. No.: 11/796,554

(22) Filed: Apr. 27, 2007

(65) Prior Publication Data

US 2007/0263990 A1    Nov. 15, 2007

Related U.S. Application Data

(63) Continuation of application No. 09/943,815, filed on Aug. 31, 2001, now Pat. No. 7,218,635.

(51) Int. Cl.
*H04N 5/93* (2006.01)

(52) U.S. Cl.
USPC .......................................... 386/356; 386/248

(58) Field of Classification Search
None
See application file for complete search history.

(56) References Cited

U.S. PATENT DOCUMENTS

| | | | |
|---|---|---|---|
| 5,504,585 A | 4/1996 | Fujinami et al. | |
| 5,734,862 A * | 3/1998 | Kulas | 711/157 |
| 5,991,502 A * | 11/1999 | Kawakami et al. | 386/329 |
| 6,009,236 A | 12/1999 | Mishima et al. | |
| 6,122,433 A | 9/2000 | McLaren | |
| 6,134,382 A | 10/2000 | Mishima et al. | |
| 6,141,491 A | 10/2000 | Yamagishi et al. | |
| 6,167,190 A | 12/2000 | Nagasawa | |
| 6,181,706 B1 | 1/2001 | Anderson et al. | |
| 6,295,094 B1 | 9/2001 | Cuccia | |
| 6,438,319 B1 * | 8/2002 | Inoue et al. | 386/265 |
| 6,453,115 B1 | 9/2002 | Boyle | |
| RE38,481 E | 3/2004 | Yonemitsu et al. | |
| 7,218,635 B2 * | 5/2007 | Haddad | 370/394 |
| 2002/0057889 A1 * | 5/2002 | Ando et al. | 386/1 |

OTHER PUBLICATIONS

Newton, Harry, Newton's Telecom Dictionary, Mar. 2004, 20th ed., p. 610.

* cited by examiner

*Primary Examiner* — Huy T Nguyen
*Assistant Examiner* — Eileen Adams
(74) *Attorney, Agent, or Firm* — Munck Wilson Mandala, LLP

(57) ABSTRACT

There is disclosed an apparatus for implementing special mode playback operations in a digital video recorder. The apparatus comprises an Intra frame indexing device capable of receiving an incoming MPEG video stream and identifying therein data packets associated with Intra frames, wherein the Intra frame indexing device modifies header information in a first data packet associated with a first Intra frame to include location information identifying a storage address of a second data packet associated with a second Intra frame.

20 Claims, 9 Drawing Sheets

APPARATUS AND METHOD FOR INDEXING MPEG VIDEO DATA TO PERFORM SPECIAL MODE PLAYBACK IN A DIGITAL VIDEO RECORDER AND INDEXED SIGNAL ASSOCIATED THEREWITH

CROSS-REFERENCE TO RELATED APPLICATIONS

This application is a continuation of U.S. patent application Ser. No. 09/943,815, filed Aug. 31, 2001, now U.S. Pat. No. 7,218,635, entitled "APPARATUS AND METHOD FOR INDEXING MPEG VIDEO DATA TO PERFORM SPECIAL MODE PLAYBACK IN A DIGITAL VIDEO RECORDER AND INDEXED SIGNAL ASSOCIATED THEREWITH". U.S. patent application Ser. No. 09/943,815 is assigned to the assignee of the present application and is incorporated by reference into this disclosure as if fully set forth herein. This disclosure hereby claims priority under 35 U.S.C. §120 to U.S. patent application Ser. No. 09/943,815.

This application is related to those disclosed in the following United States Patent Applications:
1. Ser. No. 09/943,837, filed Aug. 31, 2001, entitled "SYSTEM FOR MULTIPLEXING VIDEO DATA STREAMS IN A DIGITAL VIDEO RECORDER AND METHOD OF OPERATING THE SAME;"
2. Ser. No. 09/943,791, filed Aug. 31, 2001 and issued as U.S. Pat. No. 7,167,639 on Jan. 23, 2007, entitled "DIGITAL VIDEO RECORDER USING CIRCULAR FILE MANAGEMENT AND METHOD OF OPERATION";
3. Ser. No. 09/944,729, filed Aug. 31, 2001 and issued as U.S. Pat. No. 6,963,612 on Nov. 8, 2005, entitled "SYSTEM FOR DETECTING START CODES IN MPEG VIDEO STREAMS AND METHOD OF OPERATING THE SAME;"
4. Ser. No. 09/943,793, filed Aug. 31, 2001 and issued as U.S. Pat. No. 6,931,071 on Aug. 16, 2005, entitled "APPARATUS AND METHOD FOR SYNCHRONIZING VIDEO AND AUDIO MPEG STREAMS IN A VIDEO PLAYBACK DEVICE."

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to digital video playback device and, more specifically, to an apparatus and method, for use in a digital video recorder (DVR), for performing special mode playback of a recorded television program.

BACKGROUND OF THE INVENTION

Digital video recorder (DVR) systems are becoming increasingly popular with consumers. Digital video recorder systems use magnetic hard disk drives rather than magnetic cassette tapes to store video programs. For example, the ReplayTV™ recorder and the TiVO™ recorder record television programs in digital formats on hard disk drives using, for example, MPEG-2 compression. Also, some DVR systems may record on a readable/writable digital versatile disk (DVD) rather than a magnetic disk.

MPEG-2 compression is essential for storing a recorded television program. An uncompressed video program would require an enormous (and impractical) amount of storage space on a disk drive. Similarly, multimedia systems require an enormous amount of bandwidth to provide services such as video-on-demand, videoconferencing, and the like. However, the inherent limitations on network bandwidth are a primary inhibitor to the performance of such systems.

Therefore, compression and communication standards have been developed to overcome the bandwidth limitations of conventional communication networks. These standards define the compression of video and audio data and the delivery of control data in a single bit stream transmitted in a frequency band that would before only accommodate an analog program.

Moving Picture Experts Group (MPEG) is a family of audio and video compression standards. In the MPEG-2 standard, video compression is defined both within a given video frame (i.e., spatial compression) and between frames (i.e., temporal compression). Spatial compression is accomplished by conversion of a digital image from the time domain to the frequency domain by a discrete cosine transform, quantization, variable length coding, and Huffman coding. Temporal compression is accomplished via a process referred to as motion compensation in which a motion vector is used to describe the translation of picture elements between pictures (or frames).

ISO 13818-1 is the transport layer portion of the MPEG-2 standard, and specifies: i) packetization of audio and video elementary bit streams into packetized elementary streams (PESs), and ii) combination of audio and video PESs into a single time division or packet multiplexed bit stream for transmission and subsequent de-multiplexing into multiple bit streams for decompression and display. The single time division or packet multiplexed bit stream is as shown from various conceptual perspectives in FIGS. 1 to 5.

FIG. 1 illustrates a conceptual block diagram (generally designated 100) of the packetization of audio and video elementary bit streams and packet multiplexing according to an exemplary embodiment of the prior art. Distinct elementary streams are formed in audio encoder 105, video encoder 110, auxiliary (or other data) source 115, and systems data source 120. Each of these elementary streams is packetized into a packetized elementary stream (PES). The packetized elementary streams of audio data, video data, and the packets of other data and systems data are packet multiplexed by a MPEG-2 multiplexor into an MPEG-2 system stream.

FIG. 2 illustrates a conceptual block diagram of an exemplary time-division or packet-multiplexed bit stream (generally designated 200) according to an exemplary embodiment of the prior art. Bit stream 200 comprises a transport packet stream, wherein each packet illustratively comprises packet header 205 and payload 210 (i.e., packet data bytes) and, according to FIG. 2, optional adaptation field 215. An MPEG-2 bit stream comprises two layers, namely, a system layer (also referred to as an outer layer, a control layer, or the like) and a compression layer (also referred to as an inner layer, a payload layer, a data layer, or the like).

The MPEG-2 system layer facilitates (i) multiplexing one or more programs made up of related audio and video bit streams into a single bit stream for transmission through a transmission medium, and (ii) de-multiplexing of the single bit stream into separate audio and video program bit streams for decompression while maintaining synchronization. The system layer defines data stream syntax for timing control and synchronization and interleaving of the video and audio bit streams. The system layer is capable of: i) video and audio synchronization, ii) stream multiplexing, iii) packet and stream identification, iv) error detection, v) buffer management, vi) random access and program insertion, vii) private data, viii) conditional access, and ix) interoperability with other networks, such as those using asynchronous transfer mode (ATM). The MPEG-2 compression layer comprises the coded video and audio data streams. The system layer provides control data for multiplexing and de-multiplexing interleaved compression layers and, in doing so, defines those functions necessary for combining the compressed data streams.

FIG. 3 illustrates a conceptual block diagram of an MPEG-2-compliant decoding system (generally designated 300) according to an exemplary embodiment of the prior art. The components of decoding system 300 are well known to the skilled in the art and are therefore introduced for illustrative purposes only. Discussion of the functionality of these components will therefore be limited.

Decoding system 300 receives bit stream 200 as an input to system decoder 305. System decoder 305 de-multiplexes the system layer data of bit stream 200 into the compressed audio layer, the compressed video layer, and control data. The exemplary compressed audio layer data and video layer data are transferred to audio data buffer 310a and video data buffer 310v, respectively. The audio layer data is subsequently processed in audio decoder control block 315a and audio decoder 320a. The video layer data is subsequently processed in video decoder control block 315v and video decoder 320v. Exemplary control data is shown as program clock recovery (PCR) data, enable data, and startup values.

The MPEG-2 system layer supports a plurality of functions, namely, i) packet multiplexing and de-multiplexing of multiplexed multiple bit streams, ii) synchronous display of multiple coded bit streams, iii) buffer management and control, iv) time recovery and identification, v) random access, vi) program insertion, vii) conditional access, and viii) error tracking.

The MPEG-2 standard specifies two types of layer coding, namely, a program stream (PS) layer coding for relatively loss-less environments (e.g., CD-ROMS, DVDs, etc) and transport stream (TS) layer coding for lossy environments (e.g., cable television, satellite television, or other broadcast environments). Referring back to FIG. 2, bit stream 200 is illustratively a transport stream (TS) consisting of a plurality of TS packets divided into a packet header, an optional adaptation field, and the associated packet data (or payload). By contrast FIG. 4 illustrates a conceptual block diagram of a PES (generally designated 400) according to an exemplary embodiment of the prior art.

Packetized elementary stream (PES) 400 comprises packet header 405, optional PES header 410, and associated packet data 415. Packet header 405 comprises packet start code prefix 420, stream identifier (ID) 425, and PES packet length indicator 430. In accord herewith, all of the fields after PES packet length indicator 430 are optional. PES header 410 includes a presentation time stamp (PTS) field, a decoding time stamp (DTS) field, an elementary stream clock reference (ESCR) field, a elementary stream (ES) rate field, a DSM trick mode field, a copy information field, a prior PES clock recovery field, an extension field, and stuffing bytes.

Packet start code prefix 420 provides packet synchronization. Stream ID 425 provides packet identification and payload identification. PTS/DTS flag fields 435 and PTS/DTS fields 440 provide presentation synchronization. Data transfer is provided through the packet/header length 445, payload 415, and stuffing fields 450. Scramble control field 455 facilitates payload de-scrambling.

FIG. 5 illustrates a conceptual block diagram of an alternate time-division or packet-multiplexed bit stream (generally designated 200) according to an exemplary embodiment of the prior art. Bit stream 200 comprises access units 500, PES packets 400, and a plurality of TS packets 505. Bit stream 200 illustrates a layering relationship among access units 500, PES packets 400, and TS packets 505.

The TS layer operates to combine programs made up of PES-coded data with one or more independent time bases into a single stream. In accord with MPEG-2, a specific program does not require a unique time base, but if it does have a unique time base, the time base is the same for all of the elements of that program.

The PES layer is an inner layer portion of the MPEG-2 time division or packet multiplexed stream upon which the transport or program streams are logically constructed. The PES layer provides stream specific operations and supports the following: i) a common base of conversion between program and transport streams, ii) time stamps for video and audio synchronization and associated timing, especially for associated audio and video packets making up a broadcast channel, presentation, or program (collectively hereafter Programs), and having a common time base, iii) stream identification for stream multiplexing and de-multiplexing, and iv) such services as scrambling, VCR functions, and private data.

FIG. 5 further illustrates that, in accord with MPEG-2, each video or audio elementary stream (ES) is PES-packetized before insertion into a transport stream (TS). Elementary streams are continuous and PES packets containing an ES are generally of fixed lengths. Typically, video PES packets are on the order of tens of thousands of bytes and audio PES packets are on the order of thousands of bytes. However, video PES packets can also be specified as of undefined length. ES data, that is, access units 500, are first encapsulated into PES packets, which are, in turn, inserted into TS packets.

A transport stream may contain one or more independent, individual programs, such as individual broadcast television programs, whereby each individual program may have its own time base, and each stream comprises an individual program having its own packet identification (PID). Each separate individual program is has one or more elementary streams generally having a common time base. While not illustrated in the PRIOR ART figures, different transport streams may be combined into a single system TS.

At the transport layer, the transport sync byte provides packet synchronization. The PID field data provides packet identification, de-multiplexing and sequence integrity data. The PID field is operable to collect the packets of a stream and reconstruct the stream. Continuity counters and error indicators provide packet sequence integrity and error detection. The payload unit start indicator and adaptation control are used for payload synchronization, while the discontinuity indicator and program clock reference (PCR) fields are used for playback synchronization. The transport scramble control field facilitates payload de-scrambling. Private data transfer is accomplished through the private data flag and private data bytes. The data bytes are used for private payload data transfer, and the stuffing bytes are used to round out a packet.

A transport stream is a collection of transport stream packets linked by standard tables. These tables carry program specific information (PSI) and are built when a TS is created at the multiplexor. These tables completely define the content of the stream. Two of the tables of the TS are the program association table (PAT) and the program map table (PMT). The PAT operates as a table of contents for the TS that contains a unique identifier for the stream, a version number enabling dynamic changes of the PAT and the TS, and an association table of pairs of values. The pairs of values, PN, and PMT-PID, are the program number (PN) and the PID of the tables containing the program.

The PMT, on the other hand, describes all streams comprising a program. Each entry in the PMT is related to one program. The PMT provides a mapping between packets and programs, and contains a program number that identifies the program within the stream, a descriptor to carry private information about the program, the PID of the packets that contain the synchronization information, a number of pairs of values (e.g., stream type (ST), Data-PID) which, for each stream, specify the ST and the PID of the packets containing the data of that stream or program (Data-PID).

Collectively, these tables are used to process a particular program. At any point in time, each program has a unique PID in the PMT, which provides the PIDs for the selected program's audio, video, and control streams. The streams with the selected PIDs are extracted and delivered to the appropriate buffers and decoders for reconstruction and decoding.

Achieving and maintaining clock recovery and synchronization is a problem, especially with audio and video bit streams. In accord with the MPEG-2 standard, an end-to-end constant delay timing model digital image and audio data take the same amount of time to pass through the system from encoder to decoder. The system layer contains timing information that requires constant delay. The clock references are program clock reference (PCR) and the time stamps are the PTS and DTS.

Synchronization is accomplished using the program clock reference (PCR) data field in the TS adaptation field. PCR is typically a 42-bit field that is coded in two parts, a PCR base having a 33-bit value in units of 90 kHz, and a PCR extension having a 9-bit extension in units of 27 MHz, where 27 MHz is the system clock frequency. As a general rule, the first 33 bits of the first PCR received by the decoder initialize the counter in a clock generation, and subsequent PCR values are compared to clock values for fine adjustment. The difference between the PCR and the local clock can be used to drive a voltage-controlled oscillator, or a similar device or function, for example, to speed up or slow down the local clock.

Audio and video synchronization is typically accomplished through the presentation time stamp inserted in the PES header. The presentation time stamp is a 33-bit value in units of 90 kHz, where 90 kHz is the 27 MHZ system clock divided by 300. The presentation time stamp value indicates the time that the presentation unit should be presented to the user.

In digital video systems (e.g., MPEG-2 compliant digital video systems and HDTV compliant digital video systems), the transport layer is used to carry audio data, video data, and system data streams, in packets, to the individual decoders and system memory. The individual streams are multiplexed together with a set of buffer assumptions as defined in the MPEG-2 System Layer specification.

The popularity of digital video recorder (DVR) systems is due in part to the ability of such systems to perform special play modes (also called "trick modes" or "trick plays"). Special play modes may include, among others:

1) Fast Forward—Video is played faster than the normal viewing speed;
2) Slow Forward—Video is played slower than the normal viewing speed;
3) Normal Reverse—Video is played in reverse direction at the same speed as the normal viewing speed;
4) Slow Reverse—Video is played in reverse direction at a speed slower than the normal viewing speed; and
5) Fast Reverse—Video is played in reverse direction at a speed faster than the normal viewing speed.

Special play modes are easier to perform if the DVR system knows the structure of the video stream and can jump directly to the video frames of interest. For instance, if the location of every Intra (I) frame is known, Fast Reverse play can be achieved by decoding only the I frames picked up from the disk, but in reverse order. Selective frame picking enables the DVR system to do Fast Forward and fast and simple Reverse playback.

To implement these functions, an apparatus and method must be devised for efficient MPEG video picturing indexing for use in DVR systems. One possible solution would be to build a table or a file in which the location of each video frame is recorded. When performing special play modes, the MPEG decoder must read the table to know where the required video frames are. However, this solution has some drawbacks. It forces the application to manage a distinct file or table and to synchronize the retrieval of picture data with the stream, which is complex process. Also, the DVR system must parse the table to retrieve the useful video frame information.

Therefore, there is a need in the art for a digital video recorder (DVR) system that implements an improved apparatus and related method for performing special play modes. In particular, there is a need in the art for a DVR system that performs special play modes without using distinct files or data tables to select particular video frames.

SUMMARY OF THE INVENTION

To address the above-discussed deficiencies of the prior art, it is a primary object of the present invention to provide an apparatus and related method to perform optimized video indexing in order to perform special mode (or trick mode) playback operations in a digital video recorder. The picture indexing information is embedded in the stream itself, which simplifies file management functions. The stream is made of packets containing headers and payloads, wherein the picture information is coded into the packet headers.

In order to put the picture information in the header, that information is preferably available when the packet is written to the disk. For instance, if no buffering is used, the information cannot be the location of the next picture, as it is not yet known. However, if sufficient memory is available to buffer several frames (i.e., several I frames), then the location of the next picture can be stored in the header.

In an exemplary embodiment, the information stored in the packet header may be:
1) the location of the previous SEQUENCE header;
2) the location of the previous Intra (I) video frame;
3) the position of the SEQUENCE start code in the packet, if any;
4) the location of the I frame start code in the packet, if any;
5) the end of the sequence header in the packet, if any; and
6) the end of the I frame code in the packet, if any. This is sufficient information for all special mode playback processing.

Fast Forward (8× and More):

Fast forward at high speed is achieved by decoding only Intra pictures picked up from the disk. The present invention uses the indexing inserted into the MPEG stream to choose only the Intra video frames, or one Intra frame out of every N Intra frames.

I-Only Reverse:

I-only Reverse is achieved by decoding only Intra frames picked up from the disk, but in reverse order. The present invention uses the indexing inserted into the MPEG stream to choose only the Intra frames, or to choose only one Intra frame out of every N Intra frames.

Frame picking (or picture picking) is possible using the indexing information about the location of each Intra frame and each sequence of the stream. Relevant frames are picked out of the MPEG stream and sent as a pseudo-stream to the video decoder.

Normal Reverse and Slow Reverse:

For normal Reverse playback, the present invention puts an entire I frame-to-I frame sequence (including all intermediate bidirectional (B) frames and predicted (P) frames) in memory, then parses and decodes the sequence. This is easy to do because the Intra frame indexing indicates exactly where each I frame is located. Slow Reverse is the same as normal Reverse with a slow down factor.

Accordingly, it is a primary object of the present invention to provide an apparatus for implementing special mode playback operations in a digital video recorder. According to an advantageous embodiment of the present invention, the apparatus comprises an Intra frame indexing device capable of receiving an incoming MPEG video stream and identifying therein data packets associated with Intra frames, wherein the Intra frame indexing device modifies header information in a first data packet associated with a first Intra frame to include location information identifying a storage address of a second data packet associated with a second Intra frame.

According to one embodiment of the present invention, the second Intra frame chronologically precedes the first Intra frame.

According to another embodiment of the present invention, the second Intra frame chronologically follows the first Intra frame.

According to still another embodiment of the present invention, the location information comprises sequence information identifying a location of a video frame sequence containing the second Intra frame.

According to yet another embodiment of the present invention, the video frame sequence containing the second Intra frame chronologically precedes a video frame sequence containing the first Intra frame.

According to a further embodiment of the present invention, the video frame sequence containing the second Intra frame chronologically follows a video frame sequence containing the first Intra frame.

It is another primary object of the present invention to provide a unique indexed MPEG format signal that may be transmitted to a digital video recorder system and stored on a storage medium therein. According to an advantageous embodiment of the present invention, the unique indexed MPEG format signal comprises a plurality of data packets, the plurality of data packets comprising a first data packet associated with a first Intra frame, wherein the first data packet comprises a packet header comprising location information identifying a location in the plurality of data packets of a second data packet associated with a second Intra frame.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 6 through 10, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged digital video recorder (DVR) system.

Figure 1:
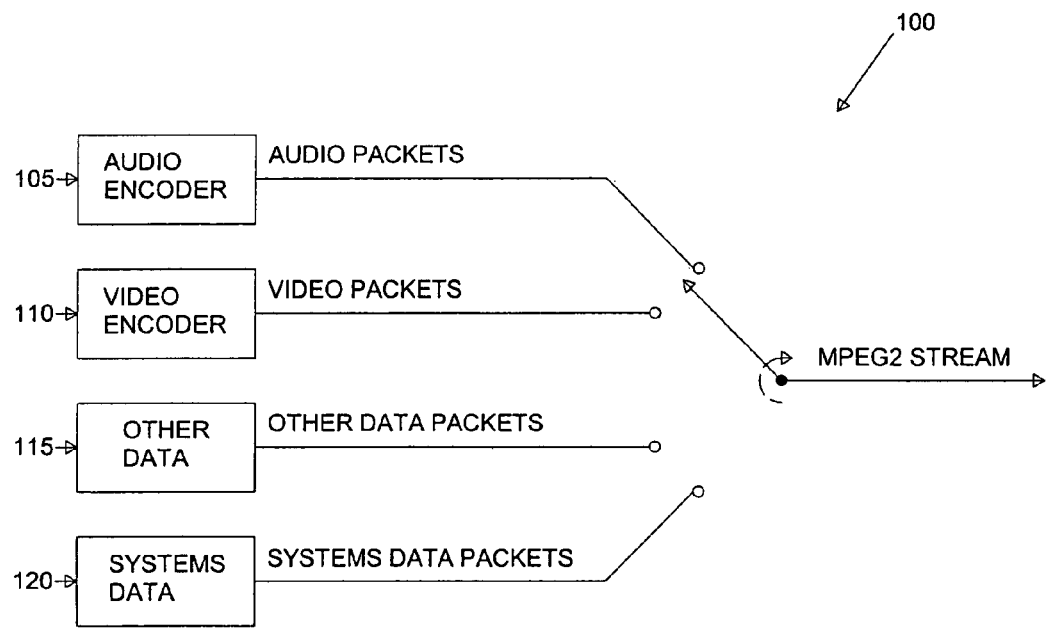
FIG. 1 illustrates a conceptual block diagram of the packetization of audio and video elementary bit streams and packet multiplexing according to an exemplary embodiment of the prior art.
Figure 2:
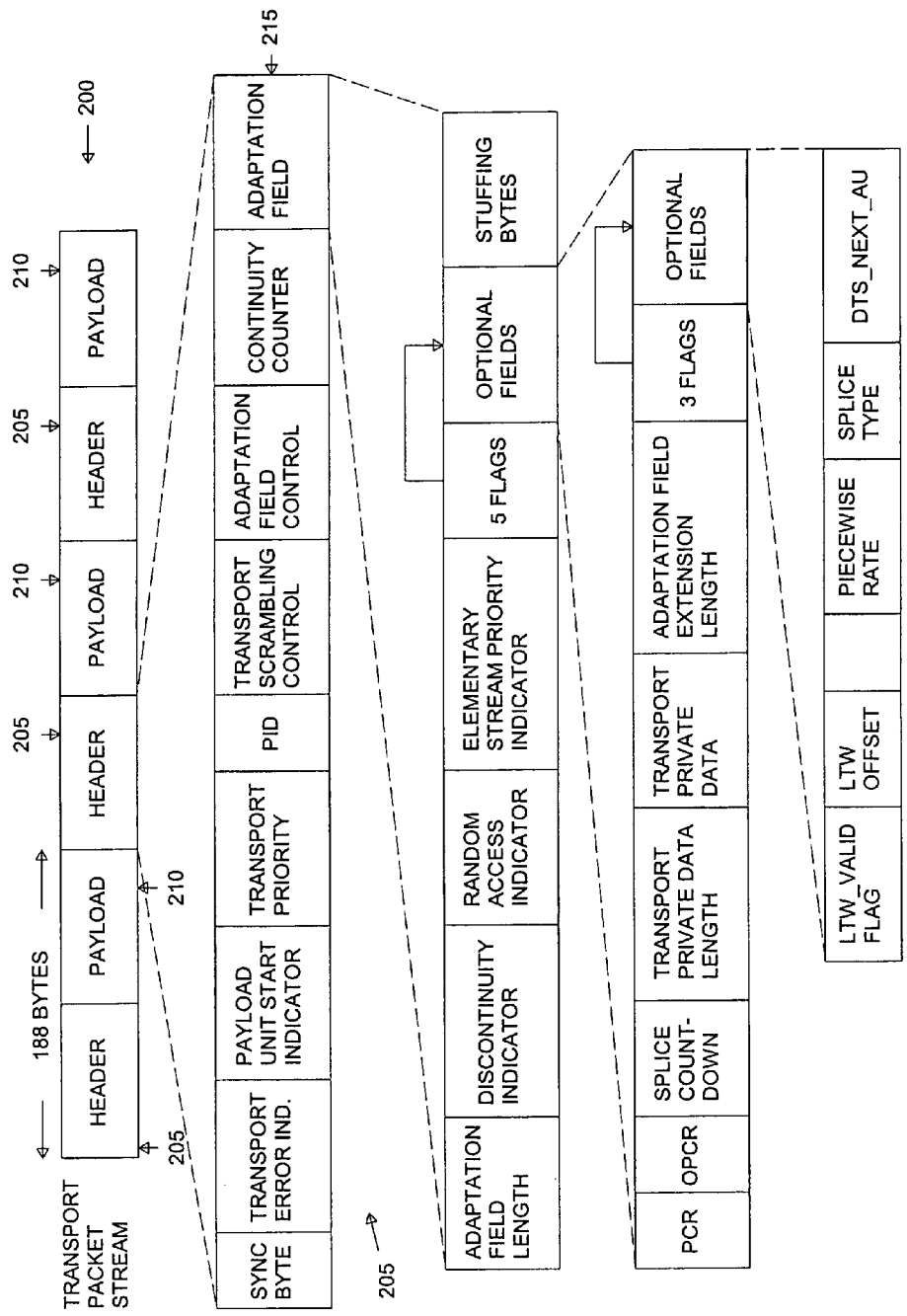
FIG. 2 illustrates a conceptual block diagram of an exemplary time-division or packet-multiplexed bit stream according to an exemplary embodiment of the prior art.
Figure 3:
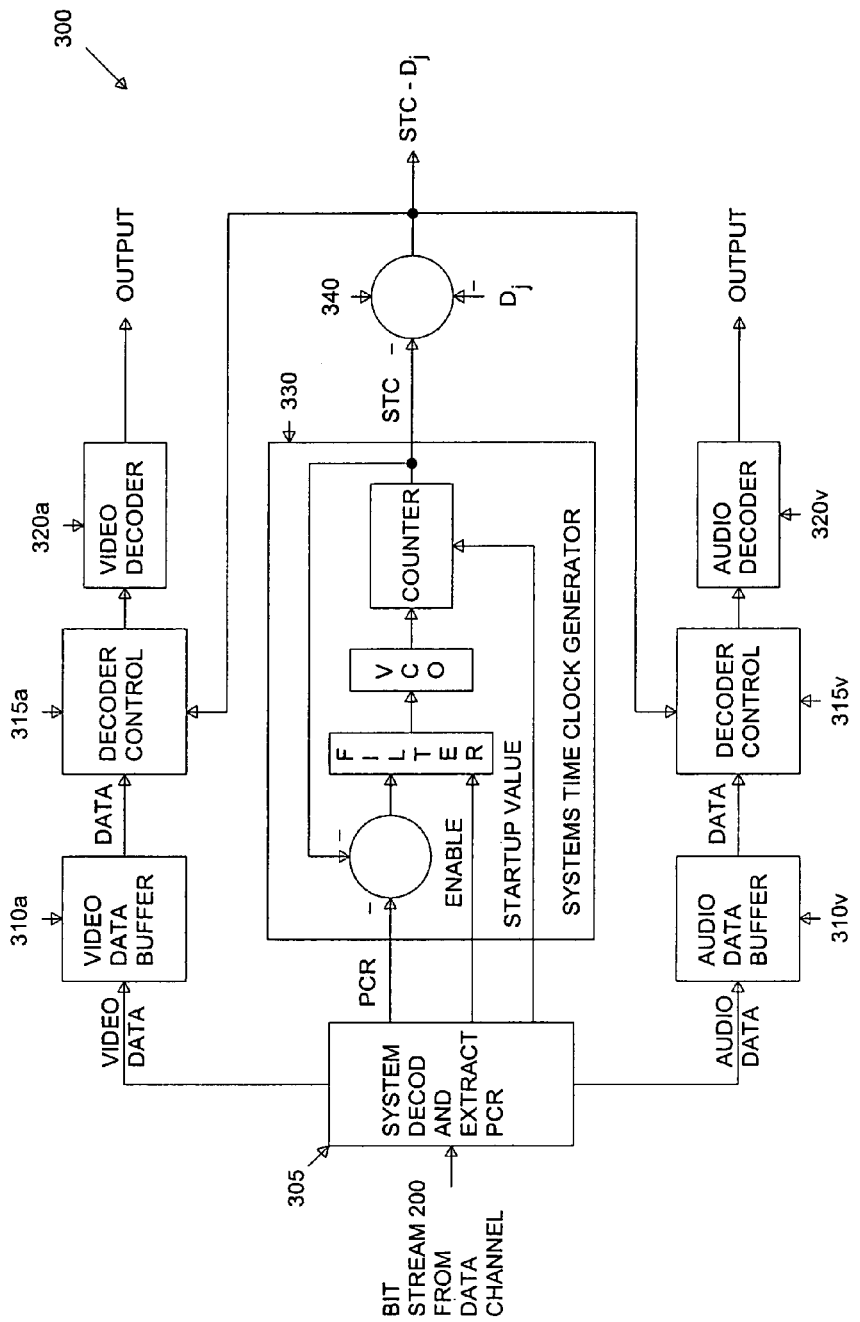
FIG. 3 illustrates a conceptual block diagram of an MPEG-2-compliant decoding system according to an exemplary embodiment of the prior art.
Figure 4:
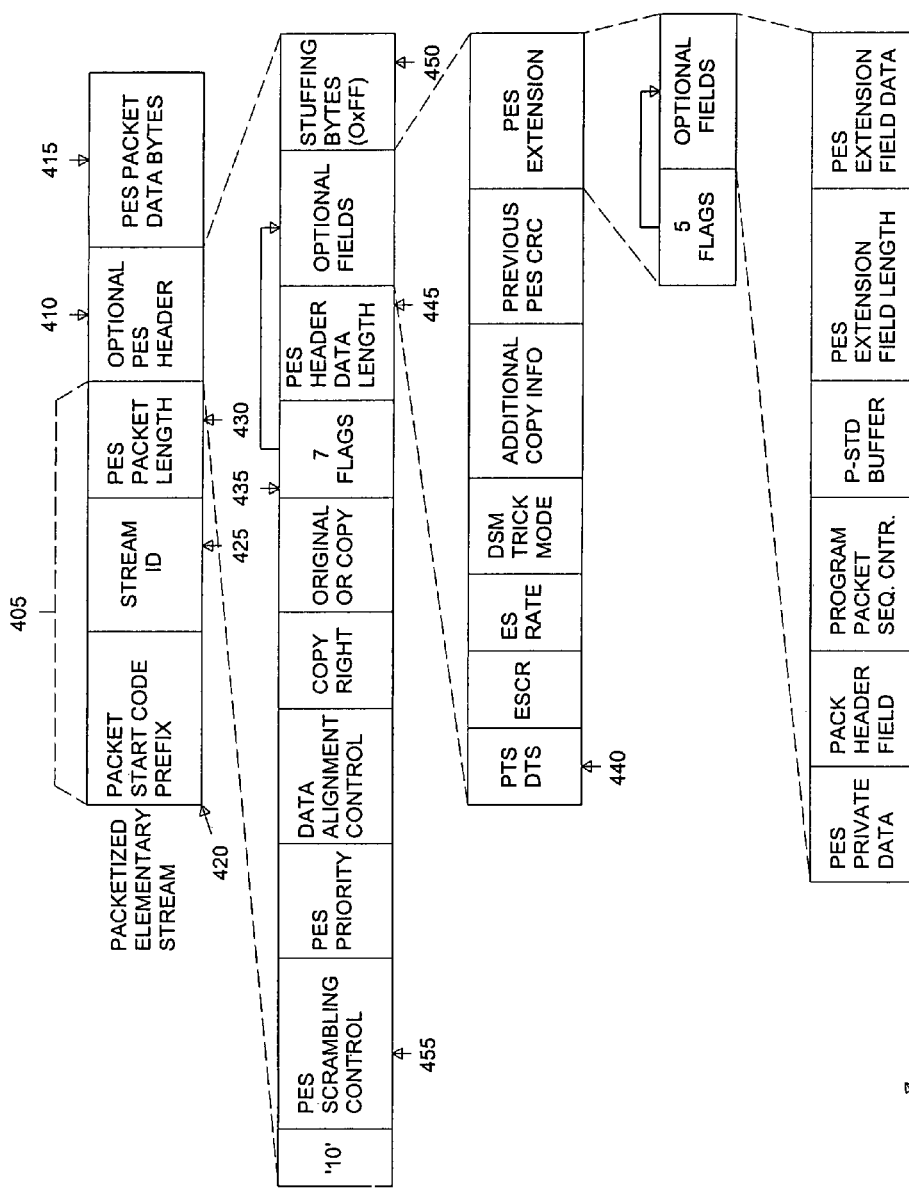
FIG. 4 illustrates a conceptual block diagram of a PES according to an exemplary embodiment of the prior art.
Figure 5:
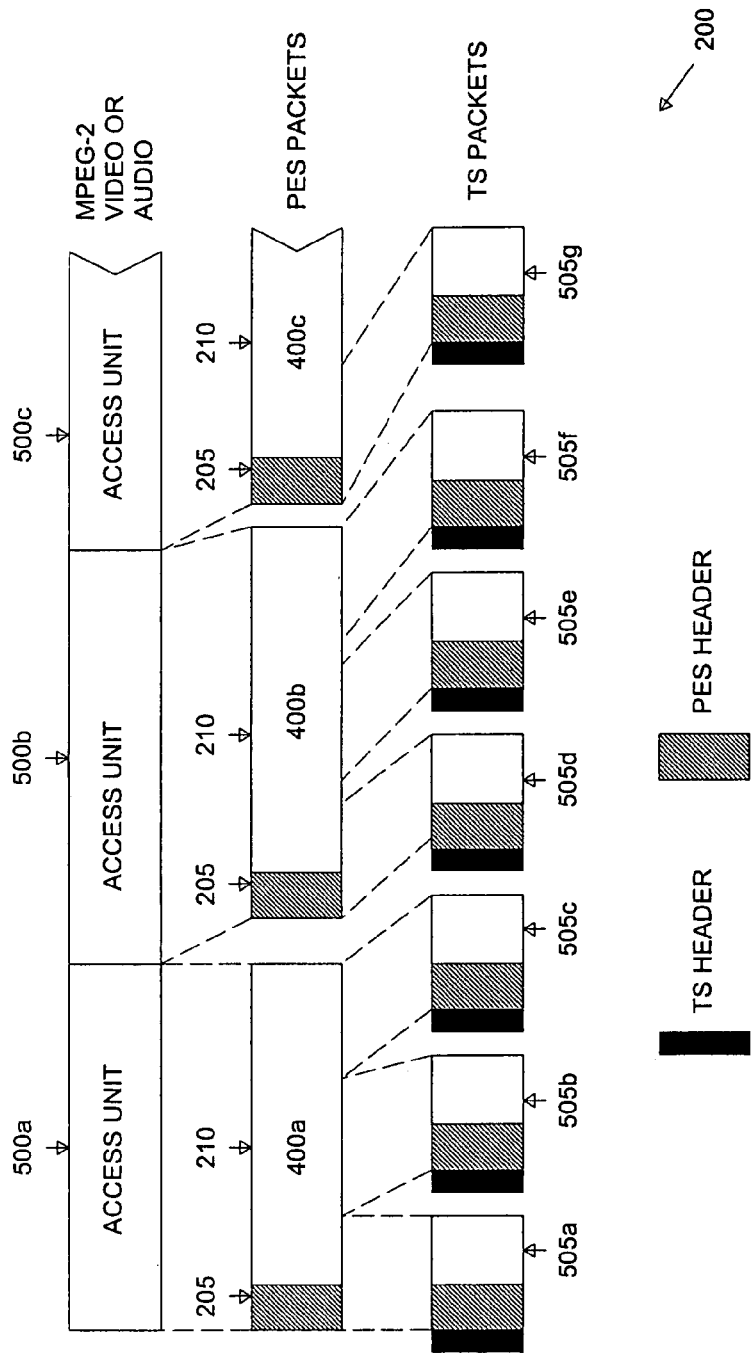
FIG. 5 illustrates a conceptual block diagram of an alternate time-division or packet-multiplexed bit stream according to an exemplary embodiment of the prior art.
Figure 6:
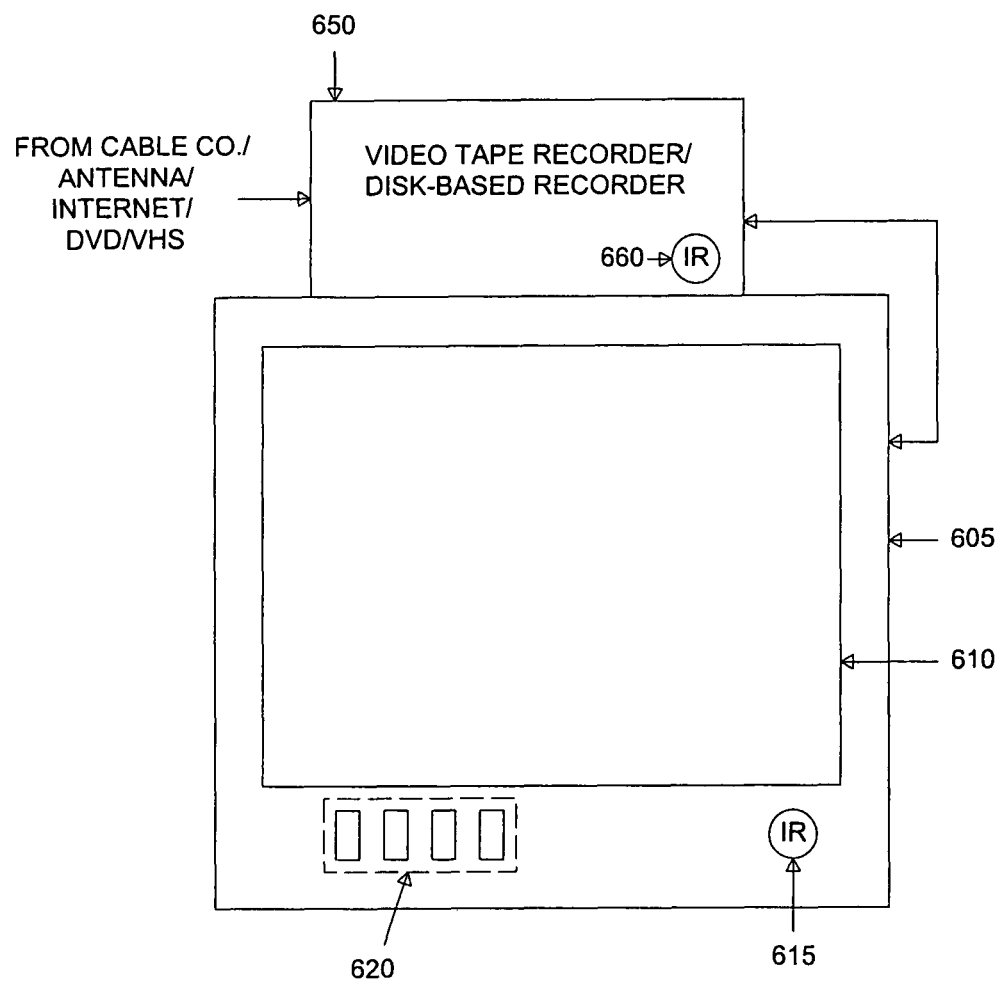
FIG. 6 illustrates an exemplary digital video recorder (DVR) system and an associated television set according to one embodiment of the present invention.

FIG. 6 illustrates exemplary digital video recorder (DVR) system 650 and television set 605 according to one embodiment of the present invention. Digital video recorder system 650 receives incoming television signals from an external source, such as a set-top box of a cable television service provider (Cable Co.) or the phone company, a local antenna, the Internet, or an attached DVD or VHS tape player, and transmits a viewer-selected channel to television set 605. In RECORD mode, digital video recorder system 650 may demodulate an incoming radio frequency (RF) television signal to produce a baseband video signal that is recorded and stored on a storage medium within or connected to video playback device 650. In PLAY mode, digital video recorder system 650 retrieves a stored baseband video signal (i.e., program) selected by the user from the storage medium and transmits the retrieved program to television set 605.

According to an exemplary embodiment of the present invention, digital video recorder (DVR) system 650 is a disk drive-based device, such as a ReplayTV™ recorder or a TiVO™ recorder, DVR system 650 stores and retrieves the incoming television signals to and from a computer magnetic hard disk rather than a magnetic cassette tape. In still other embodiments, video playback device 650 may store and retrieve from a local read/write (R/W) digital versatile disk (DVD) or R/W CD-ROM. Thus, the local storage medium may be fixed (e.g., hard disk drive) or removable (e.g., DVD, CD-ROM).

Digital video recorder system 650 comprises infrared (IR) sensor 660 that receives commands (such as Channel Up, Channel Down, Volume Up, Volume Down, Record, Play, Fast Forward (FF), Reverse, Fast Reverse, Slow Reverse, and the like) from a remote control device operated by the viewer. Television set 605 is a conventional television comprising screen 610, infrared (IR) sensor 615, and one or more manual controls 620 (indicated by a dotted line). IR sensor 615 also receives commands (such as volume up, volume down, power ON/OFF) from a remote control device operated by the viewer.

It should be noted that DVR system 650 is not limited to receiving a particular type of incoming television signal from a particular type of source. As noted above, the external source may be a cable service provider, a conventional RF broadcast antenna, a satellite dish, an Internet connection, or another local storage device, such as a DVD player. Thus, the incoming signal may be a conventional digital signal, such as MPEG-2, an conventional NTSC analog signal, or digital Internet protocol (IP) packets of any other communication protocol. However, for the purposes of simplicity and clarity in explaining the principles of the present invention, the descriptions that follow shall generally be directed to an embodiment in which DVR system 650 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 7:
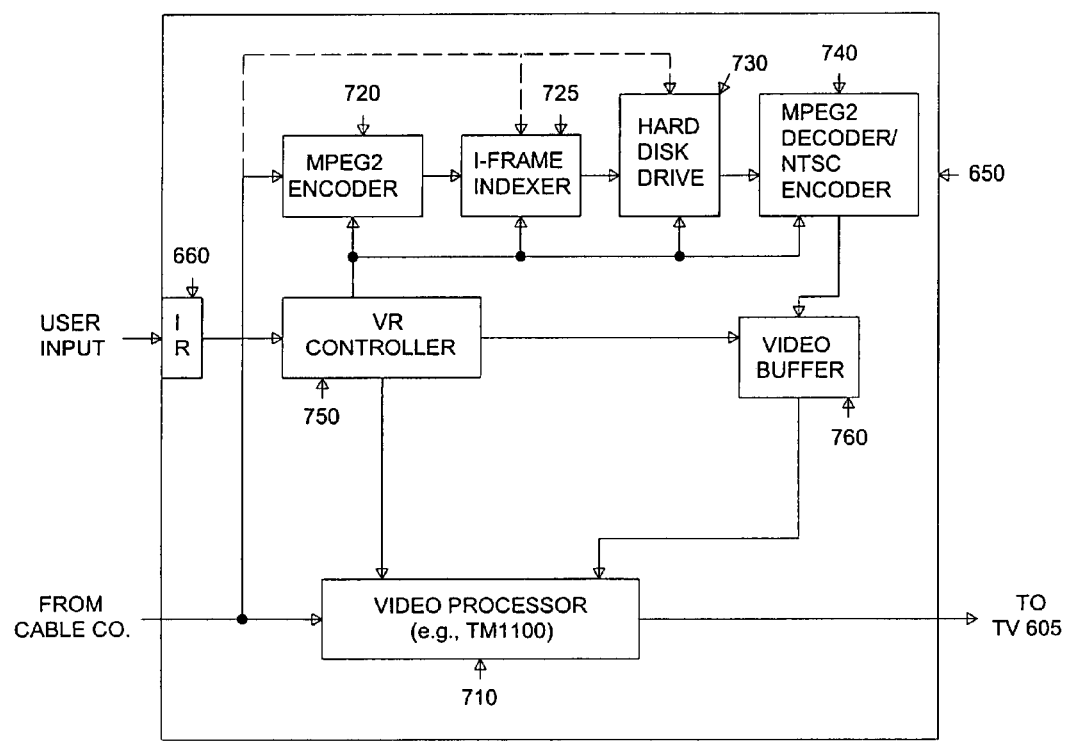
FIG. 7 illustrates the exemplary digital video recorder (DVR) system in greater detail according to one embodiment of the present invention.

FIG. 7 illustrates exemplary digital video recorder (DVR) system 650 in greater detail according to one embodiment of the present invention. DVR system 650 comprises IR sensor 660, video processor 710, optional MPEG-2 encoder 720, Intra frame (I-frame) indexer 725, hard disk drive 730, MPEG-2 decoder/NTSC encoder 740. DVR system 650 further comprises video buffer 760 and video recorder (VR) controller 750.

VR controller 750 directs the overall operation of DVR system 650, including View mode, Record mode, Play mode, Fast Forward (FF) mode, Reverse (Normal, Fast, Slow) mode, Pause mode, and Skip mode, among others. In View mode, VR controller 750 causes the incoming television signal from the cable service provider to be demodulated and processed by video processor 710 and transmitted to television set 605, without storing or retrieving from hard disk drive 730.

The internal circuitry of DVR system 650 varies depending on whether the external broadcast signal received by DVR system 650 is digital, such as MPEG-2, or analog, such as NTSC. For example, if the external broadcast signal received from the cable service provider is an analog signal, video processor 710 may be, for example, a TriMedia (TM) 6100 media processor, which contains radio frequency (RF) front-end circuitry for receiving incoming analog television signals, tuning to a user-selected channel, and converting the selected RF signal to a baseband television signal (e.g., super video signal) suitable for display on television set 605. Video processor 710 also is capable of receiving a conventional NTSC, PAL or SECAM signal from MPEG2 decoder/NTSC encoder 740 (after buffering in video buffer 760) during Play mode and transmitting baseband television signal (e.g., super video signal) to television set 605. Alternatively, if the external broadcast signal is a digital signal, such as an MPEG-2 signal, video processor 710 may be a conventional digital TV decoder, such as an MPEG-2 decoder, that converts the digital input signal to a baseband television signal for display on television set 605.

In Record mode, VR controller 750 causes the incoming television signal to be stored on hard disk drive 730. MPEG-2 encoder 720 is optionally provided if the external broadcast signal is an analog signal. For example, under the control of VR controller 750, MPEG-2 encoder 720 may receive an incoming NTSC-type analog television signal and convert the received broadcast signal to MPEG-2 format for storage on hard disk drive 730. Alternatively, if the external broadcast signal is already a digital signal, such as MPEG-2, then the broadcast signal may be stored directly to hard disk drive 730 and MPEG-2 encoder 720 may be omitted. In Play mode, VR controller 750 directs hard disk drive 730 to stream the stored television signal (i.e., program) to MPEG-2 decoder/NTSC encoder 740, which converts the MPEG-2 data from hard disk drive 730 to, for example, a super video (S-Video) signal that is buffered in video buffer 760 before video processor 710 transmits it to television set 605.

For the purposes of this application and the claims that follow, hard disk drive 730 is defined to include any mass storage device that is both readable and writable, including conventional magnetic disk drives, and optical disk drives for read/write digital versatile disks (DVD-RW), re-writable CD-ROMs, and the like. In fact, hard disk drive 730 need not be fixed in the conventional sense that is permanently embedded in DVR system 650. Rather, hard disk drive 730 includes any mass storage device that is dedicated to DVR system 650 for the purpose of storing recorded television programs. Thus, hard disk drive 730 may include an attached peripheral drive or removable disk drives (whether embedded or attached), such as a juke box device that holds read/write DVDs or re-writable CD-ROMs. Furthermore, in an advantageous embodiment of the present invention, hard disk drive 730 may include external mass storage devices that DVR system 650 may access and control via a network connection (e.g., Internet protocol (IP) connection), including, for example, a disk drive in a home personal computer (PC) or a disk drive on a server at an Internet service provider (ISP).

According to one embodiment of the present invention, MPEG-2 data from MPEG2 encoder 720 is sent to Intra frame indexer 725 prior to being stored on hard disk drive (HDD) 730. Intra frame indexer 725 detects Intra frames in the MPEG stream and modifies the header information of the data packets before storing the modified data packets to HDD 730. The modifications to the header information indexes the Intra frames in order to enable MPEG2 decoder/NTSC encoder 740 to identify and to selectively pick Intra frames from the stored MPEG data during special mode playback operations. According to another embodiment of the present invention, if DVR system 650 receives MPEG-2 data from an external source (i.e., MPEG2 encoder 720 is not included), the received MPEG-2 data stream is received directly by Intra frame indexer 725, as indicated by the dotted line. In still another embodiment of the present invention, if DVR system 650 receives from an external source MPEG-2 data that has already been indexed (i.e., MPEG2 encoder 720 and Intra frame indexer 725 are not included), the received indexed MPEG-2 data stream is stored directly to HDD 730, as indicated by the dotted line.

Figure 8:
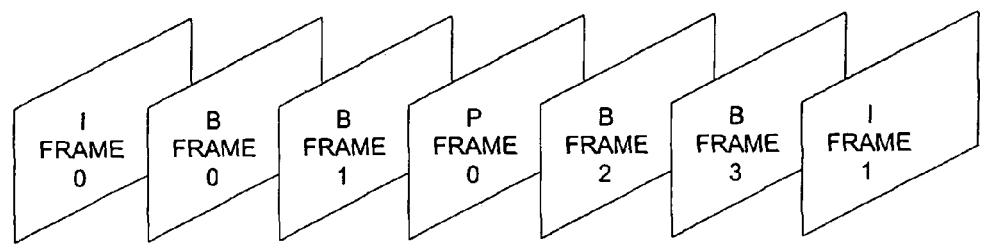
FIG. 8 illustrates a conventional video frame sequence containing Intra (I) frames, Predicted (P) frames, and Bi-directional (B) frames.

FIG. 8 illustrates conventional video frame sequence 800 containing Intra (I) frames, Predicted (P) frames, and Bi-directional (B) frames. Video frame sequence 800 comprises I Frame 0, B Frame 0, B Frame 1, P Frame 0, B Frame 2, B Frame 3, and I Frame 1. The frames are shown from left to right in the order of display during Play, such that I Frame 0 is displayed first and I Frame 1 is displayed last. Under the MPEG standard, Intra frames are encoded without reference to any other frames, so that the Intra field data and the header information in an Intra frame data packet contain all of the configuration information and pixel information needed to reconstruct all of an Intra frame. According to the MPEG standard, Predicted frames are encoded using motion compensation to modify a previous frame. Finally, Bidirectional frames are encoded using interpolation based on a previous frame and a future (or following) frame. As an example, P Frame 0 may be encoded using motion compensation to modify I Frame 0. Also, B Frame 0 may be encoded by interpolating between I Frame 0 and P Frame 0.

Figure 9:
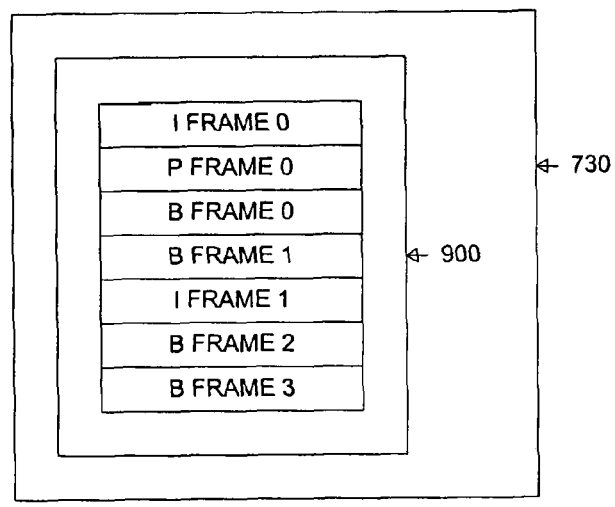
FIG. 9 illustrates the manner in which the Intra (I) frames, Predicted (P) frames, and Bi-directional (B) frames of the to conventional video frame sequence are transmitted and stored in the exemplary hard disk drive.

FIG. 9 illustrates the manner in which the Intra (I) frames, Predicted (P) frames, and Bi-directional (B) frames of conventional video frame sequence 800 are transmitted and stored in exemplary hard disk drive 730. Frames are not transmitted in display order (i.e., as shown in FIG. 8), but rather in the order in which the MPEG decoder requires the frames to decode the MPEG bit stream. In other words, the MPEG decoder must have the reference frames before any Predicted or Bi-directional frames can be decoded. Thus, video frame sequence 800 is transmitted and stored in video file 900 on hard disk drive 730 in the following order: I Frame 0, P Frame 0, B Frame 0, B Frame 1, I Frame 1, B Frame 2, and B Frame 3 (i.e., top to bottom order).

Figure 10:
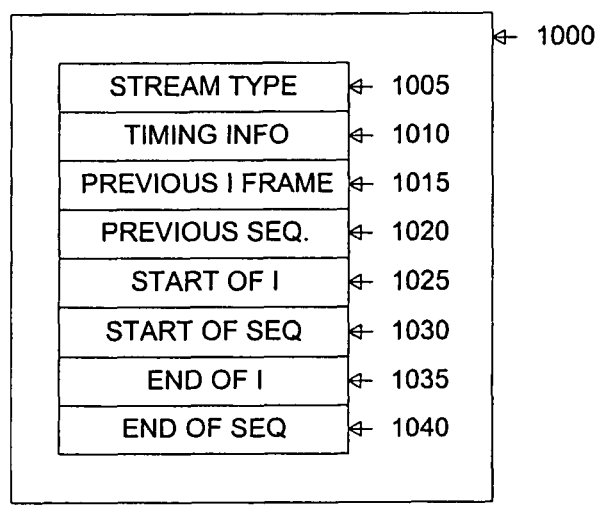
FIG. 10 illustrates exemplary portions of the modified header of an exemplary Intra frame according to one embodiment of the present invention.

FIG. 10 illustrates exemplary portions of the modified header of exemplary Intra frame 1000 according to one embodiment of the present invention. Intra frame 1000 may be, for example, Intra frame 0 or Intra frame 1 in video frame sequence 800. The header data fields of Intra frame 1000 are shown in generalized form and include stream type field 1005 and timing information field 1010. The header information in Intra frame 1000 is also modified by Intra frame indexer 725 to include new data fields that identify the location of other Intra fields in order to implement special mode (i.e., trick mode) playback operations according to the principles of the present invention.

For example, the header information in Intra frame 1000 comprises:

1. Previous Intra frame field 1015 contains the location of the previous Intra (I) video frame;
2. Previous Sequence field 1020 contains the location of the previous SEQUENCE header;
3. Start of Intra frame data field 1025 contains the location of the I frame start code in the packet, if any;
4. Start of Sequence field 1030 contains the position of the SEQUENCE start code in the packet, if any;
5. End of Intra frame data field 1035 contains the end of the I frame code in the packet, if any; and
6. End of Sequence field 1040 contains the end of the sequence header in the packet, if any.

As noted above, Intra frame indexer 725 adds the new header information to each Intra frame as the Intra frame is saved to hard disk drive 730. According to an advantageous embodiment of the present invention, Intra frame indexer 725 may be implemented as a controller comprising a data processor and associated memory. The associated memory stores an indexing application executed by the data processor. The memory may also store one or more Intra frames or header information for same prior to writing the Intra frames to hard disk drive 730.

The exemplary Intra frame 1000 in FIG. 10 contains data fields that identify the location of a previous Intra frame. The previous Intra frame information may then be used to perform special mode playback functions. However, in an alternate embodiment of the present invention, Intra frame 1000 may also contain data fields that identify the location of at least one future Intra frame. This may be accomplished by temporarily storing a sequence of several Intra frames in Intra frame indexer 725 and then modifying the header information of the stored Intra frames to identify the location of a previous Intra frame, a future Intra frame, or both.

The special mode playback operations are then performed by MPEG-2 decoder/NTSC encoder 740, which is capable of selectively picking Intra frames using the modified header information of the Intra frames stored on hard disk drive 730. The header information allows MPEG-2 decoder/NTSC encoder 740 to rapidly locate and retrieve Intra frames during various Fast Forward and Reverse playback modes.

In the foregoing description of an exemplary embodiment of the present invention, the modified header information identifies the location of previous or following Intra frames in a conventional MPEG stream. However, this is by way of example only and should not be construed so as to limit the scope of the present invention. Those skilled in the art will recognize that the present invention may also be used to identify the location of selected Intra-type frames in video streams that do not conform to the MPEG standard. By way of example, U.S. patent application Ser. No. 09/943,837, entitled "SYSTEM FOR MULTIPLEXING VIDEO DATA STREAMS IN A DIGITAL VIDEO RECORDER AND METHOD OF OPERATING THE SAME" and previously incorporated by reference into the present disclosure, describes a novel apparatus and method for converting a conventional MPEG stream of PES packets comprising packet payloads and related packet headers of varying sizes into a non-conventional stream having packets comprising fixed size payloads and fixed size packet headers. In an alternate embodiment, the present invention is particularly suited for use in association with the invention disclosed in U.S. patent application Ser. No. 09/943,837 because the fixed size payloads and fixed size packet headers may be stored to a disk drive in known block sizes. The known block sizes allow the address of a previous Intra frame or following Intra frame to be calculated very rapidly and stored in the header information of the current fixed size packet header according to the principles of the present invention.

Although the present invention has been described in detail, those skilled in the art should understand that they can make various changes, substitutions and alterations herein without departing from the spirit and scope of the invention in its broadest form.

What is claimed is:

1. A recorded video product embodied in a non-transitory computer readable storage medium, the recorded video product comprising:
    a plurality of data packets stored on the computer readable storage medium and containing, for an incoming Motion Picture Experts Group (MPEG) video stream for a television program, data that may be converted to a baseband video signal capable of being displayed on a television set coupled to a digital video recorder housing the non-transitory computer readable storage medium, the plurality of stored data packets comprising a first data packet associated with a first Intra frame,
    wherein the first data packet comprises a packet header modified during Intra frame indexing to include information indicating:
        a location within the plurality of stored data packets of a previous SEQUENCE header,
        a location within the plurality of stored data packets of a second Intra frame,
        a position within the first data packet of a SEQUENCE start code, if the SEQUENCE start code exists,
        a location within the first data packet of an I frame start code, if the I frame start code exists,
        an end within the first data packet of a sequence header, if the sequence header exists, and
        an end within the first data packet of an I frame code, if the I frame code exists,
    wherein the first data packet is configured to enable the digital video recorder to play the television program with special playback mode operations by reading the information is stored in the modified packet header of the first data packet.

2. The recorded video product as set forth in claim 1, wherein the second Intra frame chronologically precedes the first Intra frame.

3. The recorded video product as set forth in claim 1, wherein the second Intra frame chronologically follows the first Intra frame.

4. The recorded video product as set forth in claim 1, wherein the location within the plurality of stored data packets of the second Intra frame comprises sequence information identifying a location of a video frame sequence containing the second Intra frame.

5. The recorded video product as set forth in claim 4, wherein the video frame sequence containing the second Intra frame chronologically precedes a video frame sequence containing the first Intra frame.

6. The recorded video product as set forth in claim 4, wherein the video frame sequence containing the second Intra frame chronologically follows a video frame sequence containing the first Intra frame.

7. A system for playing back a recorded television program, the system comprising:
    a video processor configured to receive an incoming television program and to convert the incoming television program to a baseband video signal capable of being displayed on a television set coupled to the digital video recorder;
    a storage disk configured to store the incoming television program;
    an apparatus configured to implement special mode playback operations, the apparatus comprising an Intra frame indexing device configured to receive an incoming MPEG video stream and to identify therein data packets in a first Intra frame, wherein the Intra frame indexing device is configured to modify header information in a first data packet associated with the first Intra frame to include information indicating:
        a location within the plurality of stored data packets of a previous SEQUENCE header,
        a location within the plurality of stored data packets of a second Intra frame,
        a position within the first data packet of a SEQUENCE start code, if the SEQUENCE start code exists,
        a location within the first data packet of an I frame start code, if the I frame start code exists,
        an end within the first data packet of a sequence header, if the sequence header exists, and
        an end within the first data packet of an I frame code, if the I frame code exists; and
    a digital video recorder configured to play the recorded television program with the special mode playback operations by reading the information stored in the modified packet header of the first data packet.

8. The system as set forth in claim 7, wherein the storage disk is configured to store a plurality of data packets including the first data packet.

9. The system as set forth in claim 7, wherein the second Intra frame chronologically precedes the first Intra frame.

10. The system as set forth in claim 7, wherein the second Intra frame chronologically follows the first Intra frame.

11. The system as set forth in claim 7, wherein the location within the plurality of stored data packets of the second Intra frame comprises sequence information identifying a location of a video frame sequence containing the second Intra frame.

12. The system as set forth in claim 11, wherein the video frame sequence containing the second Intra frame chronologically precedes a video frame sequence containing the first Intra frame.

13. The system as set forth in claim 11, wherein the video frame sequence containing the second Intra frame chronologically follows a video frame sequence containing the first Intra frame.

14. For use in a digital video recorder, a method of enabling at least one special mode playback operation, the method comprising:
    receiving a Motion Picture Experts Group (MPEG) video stream for a television program, the MPEG video stream comprising data packets containing data that may be converted to a baseband video signal capable of being displayed on a television set coupled to the digital video recorder;
    identifying, in the received MPEG video stream, data packets associated with Intra frames;
    during Intra frame indexing, modifying a packet header in a first of the data packets that is associated with a first Intra frame to include information indicating:
        a location within the plurality of stored data packets of a previous SEQUENCE header,
        a location within the plurality of stored data packets of a second Intra frame, a position within the first data packet of a SEQUENCE start code, if the SEQUENCE start code exists, a location within the first data packet of an I frame start code, if the I frame start code exists, an end within the first data packet of a sequence header, if the sequence header exists, and an end within the first data packet of an I frame code, if the I frame code exists; and playing the MPEG video stream in the at least one special mode playback operation by reading information stored in the modified packet header of the first data packet.

15. The method as set forth in claim 14, wherein the second Intra frame chronologically precedes the first Intra frame.

16. The method as set forth in claim 14, wherein the second Intra frame chronologically follows the first Intra frame.

17. The method as set forth in claim 14, wherein the location within the plurality of stored data packets of the second Intra frame comprises sequence information identifying a location of a video frame sequence containing the second Intra frame.

18. The method as set forth in claim 17, wherein the video frame sequence containing the second Intra frame chronologically precedes a video frame sequence containing the first Intra frame.

19. The method as set forth in claim 17, wherein the video frame sequence containing the second Intra frame chronologically follows a video frame sequence containing the first Intra frame.

20. An apparatus configured to provide at least one special mode playback operation, the apparatus comprising:

an Intra frame indexing device configured to receive an incoming Motion Picture Experts Group (MPEG) video stream for a television program, for a television program, the MPEG video stream comprising data packets containing data that may be converted to a baseband video signal capable of being displayed on a television set coupled to the digital video recorder, and to identify therein data packets associated with Intra frames, wherein the Intra frame indexing device is configured to modify header information in a first data packet associated with a first Intra frame to include information indicating:

a location within the plurality of stored data packets of a previous SEQUENCE header, a location within the plurality of stored data packets of a second Intra frame, a position within the first data packet of a SEQUENCE start code, if the SEQUENCE start code exists, a location within the first data packet of an I frame start code, if the I frame start code exists, an end within the first data packet of a sequence header, if the sequence header exists, and an end within the first data packet of an I frame code, if the I frame code exists, wherein the location within the plurality of stored data packets of the second Intra frame comprises sequence information identifying a location of a video frame sequence containing the second Intra frame; and a digital video device configured to play the MPEG video stream in the at least one special mode playback operation by reading the information stored in the modified packet header of the first data packet.

* * * * *